United States Patent [19]

Marx

[11] Patent Number: 4,861,997

[45] Date of Patent: Aug. 29, 1989

[54] STEREOSCOPIC THERMOGRAPHIC APPARATUS

[75] Inventor: Dieter Marx, Aalen-Waldhausen, Fed. Rep. of Germany

[73] Assignee: Carl-Zeiss-Stiftung, Heidenheim, Fed. Rep. of Germany

[21] Appl. No.: 89,068

[22] Filed: Aug. 25, 1987

[30] Foreign Application Priority Data

Aug. 29, 1986 [DE] Fed. Rep. of Germany ...... 3629458

[51] Int. Cl.[4] .................. G02B 26/10; G02B 27/22
[52] U.S. Cl. ............................ 250/334; 250/330; 350/130; 350/133; 350/137; 350/138
[58] Field of Search ............ 250/330, 331, 332, 333, 250/334, 213 VT; 313/523, 524; 350/130–143; 358/88, 89, 90, 91, 92, 113; 356/12, 13, 14

[56] References Cited

U.S. PATENT DOCUMENTS

| 3,251,933 | 5/1966 | Beste | 358/92 |
| 3,670,097 | 6/1972 | Jones | 350/138 |
| 4,574,197 | 3/1986 | Kliever | 250/347 X |
| 4,601,053 | 7/1986 | Grumet | 356/12 X |

Primary Examiner—David Mis
Attorney, Agent, or Firm—Stonebraker, Shepard & Stephens

[57] ABSTRACT

A compact stereoscopic thermographic IR viewing device is disclosed, which comprises a thermographic apparatus in front of which two binocular telescopes are arranged. One of the two telescopes images an IR scene in two intermediate images which differ slightly in perspective. These images are separated by stops on the detector of the thermographic apparatus so that an observer notes the scene in perspective through a second binocular telescope.

6 Claims, 1 Drawing Sheet

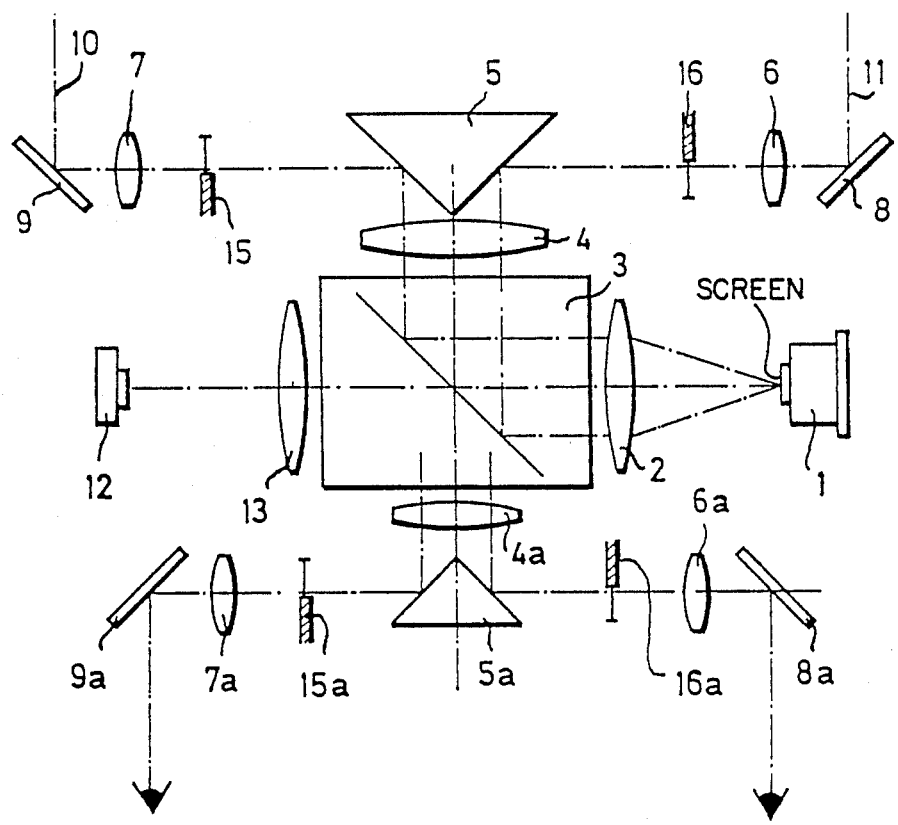

STEREOSCOPIC THERMOGRAPHIC APPARATUS

BACKGROUND OF THE INVENTION

This invention relates to a stereoscopic thermographic apparatus which includes a detector, an objective, a scanner system, and a binocular telescope system for image recording and for reproduction.

Such stereoscopic thermographic apparatus is known, for example, from a PCT patent application of Waldo W. Kliever (Hughes Aircraft Company) published 27 Sept. 1984 as International Publication No. WO 84/03777, claiming priority from U.S. application Ser. No. 478,438, filed 24 March 1983, now U.S. Pat. No. 4,574,197, granted Mar. 4, 1986.

In that known apparatus, the separation of the two optical channels is effected by offering the image of the right hand optical channel and the image of the left hand optical channel alternately to the detector. The separation of the two channels for the reproduction of the picture takes place in an electronic system which further processes the signals separately.

The object of the present invention is to simplify the feeding of the two stereoscopic half-images to the detector and the separating of the two optical channels for the reproduction.

SUMMARY OF THE INVENTION

This object is achieved, in accordance with the invention, by offering the image from one optical channel (e.g., the right hand optical channel) to one half of the detector, and the image from the other optical channel (e.g., the left hand optical channel) to the other half of the detector, and by using, in the telescope systems for image recording and image reproduction, a main objective (4 and 4a) which is common to both optical channels and a splitting prism (5 and 5a), and by providing, in the right and left optical channels of each telescope system, another objective (6, 7, 6a, 7a) and at least one reflecting mirror (8, 9, 8a, 9a).

For reproduction of the IR(infra-red) pictures, light-emitting diodes are preferably provided, the images of which diodes are focused on infinity by means of an objective arranged in front of the diodes and a scan mirror.

This invention has the advantage of enabling a very compact and relatively simple construction of a binocular viewing instrument for stereoscopic observation in the IR region of the spectrum.

BRIEF DESCRIPTION OF THE DRAWING

The single view is a schematic or diagrammatic illustration of a preferred embodiment of the invention.

DETAILED DESCRIPTION

Referring to the drawing, the detector is shown at 1. The objective 4 is the principal objective for the image recording telescope system. The divider prism 5 produces a pupil division of the IR beam. The result is that the objective 4 produces two image planes in which images of the detector line and of the IR scene are produced. One of these two image planes contains images from the right-hand viewing axis or optical channel 11, via the objective 6 and mirror 8; the other contains images from the left-hand viewing axis or optical channel 10, via the objective 7 and mirror 9. These intermediate images are focused on infinity by the objectives 6 and 7.

Due to the separation distance between the two optical axes 10 and 11, these intermediate images differ slightly in perspective. Despite this, if both intermediate images were focused jointly on the detector 1, no three-dimensional image would result, since the detector can not distinguish between the two images. For the separating of the two images, half of the lines on the detector screen are blocked or masked off from the right hand channel, and the other half are masked off from the left half channel. In the case of thermographic apparatus having 120lines, lines 1 to 60 in the right hand channel and lines 61 to 120 in the left hand channel are, for instance, masked off by the masking members 16 and 15, respectively. If the two mirrors 8 and 9 are now adjusted so that the two optical axes 10 and 11 are precisely parallel to each other, then images of different perspective of the same IR scene are fed to the two detector screen portions, via the objective 4, the scan mirror 3, and the objective 2.

For the reproduction of the IR images, the image of the light-emitting diodes 12 is focused on infinity via the objective 13 and the scan mirror 3, which is rotated in a manner well understood by those skilled in the art. Similarly to the action in the recording channels, a pupil division now takes place also in the reproduction channels of the binocular reproduction telescope by means of the divider prism 5a behind the objective 4a.

In the intermediate image planes of the reproduction optical system, half of the lines of the screen of the detector 1 are again covered or masked off (by the masking elements 15a and 16a) so that the left eye of the observer, looking into the left ocular 7a, 9a, sees only screen lines 1 to 60 of a 120-line screen (or lines 1 to n, of a screen having 2n lines), and the right eye of the observer, looking into the right ocular 6a, 8a, sees only lines 61 to 120 (or lines n+1 to 2n). Here also the two ray paths are adjusted precisely parallel to each other, by adjustment of the mirrors 8a and 9a. Now if one looks into the two oculars, one obtains the impression of a three-dimensional picture.

Various objectives or lenses shown schematically in the drawing as single elements, may in practice consist of two or more components, as well understood in the art.

What is claimed is:

1. A stereoscopic thermographic apparatus comprising a detector (1), an infra-red (IR) objective (2), a scanner system (3), a first binocular telescope system for recording an image, said first telescope system having a left optical channel and a right optical channel, and a left mask arranged in said left optical channel for delivering a signal from only said left optical channel to only a first half of said detector and a right mask arranged in said right optical channel for delivering a signal from only said right optical channel to only a second half of said detector.

2. The invention defined in claim 1, wherein said first binocular telescope system includes adjustable reflecting means adjusted to provide left and right optical channels precisely parallel to each other.

3. The invention defined in claim 2, further comprising a second binocular telescope system for reproduction of an image from said detector.

4. A stereoscopic thermographic image recording and reproducing apparatus comprising a pair of binocular telescopes arranged respectively for recording and reproducing an image, each binocular telescope providing a left optical channel and a right optical channel, said telescopes including divider prisms (5, 5a) common to both said left and right channels, objectives (4, 4a) common to both said left and right channels, a scanning system common to both said left and right channels, additional objectives (6, 6a, 7, 7a) individual to respective ones of said left and right channels, and at least one reflecting mirror (8, 8a, 9, 9a) individual to respective ones of said left and right channels.

5. The invention defined in claim 4, further comprising light-emitting diodes (12) for reproducing an infrared (IR) picture, and an objective (13) and a scan mirror (3) for focusing an image of said picture at infinity.

6. The invention defined in claim 5, further comprising a detector screen for receiving said IR image, a left ocular and a right ocular for binocular viewing of said IR image on said screen, and masking means associated with said oculars for masking one half of said screen as seen by one ocular and for masking the other half of said screen as seen by the other ocular.

* * * * *